(12) United States Patent
Bruyère et al.

(10) Patent No.: US 8,486,216 B2
(45) Date of Patent: Jul. 16, 2013

(54) PROCESS FOR FORMING FIBER-CONTAINING ARTICLES SUCH AS ANNULAR OR ELLIPSOIDAL PREFORMS

(75) Inventors: Alain Bruyère, Las Avenieres (FR); Jean Benoit Thiel, La Tour du Pin (FR)

(73) Assignee: Hexcel Reinforcement, Villeurbanne (FR)

( * ) Notice: Subject to any disclaimer, the term of this patent is extended or adjusted under 35 U.S.C. 154(b) by 1698 days.

(21) Appl. No.: 11/495,396

(22) Filed: Jul. 28, 2006

(65) Prior Publication Data

US 2007/0023139 A1 Feb. 1, 2007

(30) Foreign Application Priority Data

Jul. 29, 2005 (FR) ........................................ 05 08136
Jul. 29, 2005 (FR) ........................................ 05 08137

(51) Int. Cl.
*B29C 65/00* (2006.01)
*B32B 37/00* (2006.01)

(52) U.S. Cl.
USPC .......... 156/297; 156/180; 156/299; 29/419.1; 28/100

(58) Field of Classification Search
USPC ................. 156/166, 180, 182, 297, 176, 177, 156/181, 299, 307.1, 307.7, 433, 441, 300; 29/419.1; 242/157 R; 28/101, 107, 100
See application file for complete search history.

(56) References Cited

U.S. PATENT DOCUMENTS

| | | | |
|---|---|---|---|
| 3,130,453 A | 4/1964 | Haigler, Jr. | |
| 3,708,132 A | 1/1973 | Lang | |
| 4,285,752 A * | 8/1981 | Higgins | ........................ 156/250 |
| 4,301,579 A * | 11/1981 | Van den Hoven | .............. 28/282 |
| 4,421,584 A | 12/1983 | Kitagawa et al. | |
| 4,699,683 A | 10/1987 | McCowin | |
| 4,790,900 A | 12/1988 | Guillon et al. | |
| 4,877,471 A | 10/1989 | McCowin et al. | |
| 5,364,491 A * | 11/1994 | Aochi et al. | ................... 156/446 |
| 6,049,956 A | 4/2000 | Lifke et al. | |
| 6,585,842 B1 | 7/2003 | Bompard et al. | |
| 7,115,180 B2 | 10/2006 | Bruyere | |
| 2005/0235471 A1* | 10/2005 | Delecroix | ........................ 28/107 |
| 2006/0090314 A1* | 5/2006 | Delecroix | ........................ 28/100 |

FOREIGN PATENT DOCUMENTS

| | | |
|---|---|---|
| EP | 0681981 | 11/1985 |
| EP | 0535264 | 4/1993 |
| FR | 1584056 | 12/1969 |
| FR | 2579964 | 10/1986 |

(Continued)

OTHER PUBLICATIONS

Search Report for FR0508137.
Search Report for FR0508136.

*Primary Examiner* — John Goff
(74) *Attorney, Agent, or Firm* — Withers & Keys, LLC (57) ABSTRACT

A process for placing at least one fiber element on a surface is disclosed so as to provide a deposited fiber element having a width that varies longitudinally. The process may provide a step in which the width of the fiber element is modified upstream of the deposition step using a width control device. A device for performing the process is also disclosed. Further, fibrous sheets containing one or more deposited fiber element having a width that varies longitudinally are also disclosed. Preforms formed from one or more of the fibrous sheets are also disclosed.

18 Claims, 6 Drawing Sheets

FOREIGN PATENT DOCUMENTS

| | | |
|---|---|---|
| FR | 2853914 | 10/2004 |
| JP | 06210748 A * | 8/1994 |
| WO | 84/00351 | 2/1984 |
| WO | 98/44183 | 10/1998 |

\* cited by examiner

PROCESS FOR FORMING FIBER-CONTAINING ARTICLES SUCH AS ANNULAR OR ELLIPSOIDAL PREFORMS

TECHNICAL FIELD

The present invention relates to composite preforms. The present invention further relates to processes for placing fiber elements along a surface so as to extend in non-parallel directions. Such processes are particularly adapted for use in the formation of preforms, such as annular or ellipsoidal preforms.

BACKGROUND

The fabrication of composite parts or items containing one or more fibrous reinforcements on one hand and a thermoplastic or thermohardenable (i.e., thermosettable) resin matrix on the other hand may be accomplished, for example, by Resin Transfer Molding (RTM) techniques. RTM consists of two stages: (i) fabricating a fiber preform in the shape of the desired finished item, and (ii) impregnating the preform with a thermoplastic or thermohardenable resin. The resin is injected or infused by aspiration and then thermocompressed to harden the resin after polymerization.

Preforms generally contain several superimposed sheets of fiber elements bound to each other by a binder in order to provide cohesion of the preform components and to allow handling of the preform. The preform typically contains only a small amount of binder, present solely to assure the binding of the fiber elements to each other. The resin necessary to fabricate a given composite part is added subsequently at the time the desired composite part is molded. The fiber elements can be either strands or cables, depending on the number of filaments or fibers. Most often, performs comprise superimposed unidirectional sheets such that the fiber elements are stretched parallel to each other in each of the sheets with the various unidirectional sheets extending in different directions.

Notably, for applications in the aeronautic, aerospace, and automobile domains, it is sometimes necessary to form performs having at least one portion which has an annular, an ellipsoidal, or a truncated cone shape such as in the construction of frames, portholes, reactor jets or intakes. The use of preforms comprising unidirectional sheets to fabricate such parts creates parts having mechanical characteristics that are not always adapted to their use, insofar as the reinforcement fiber elements that compose the fibrous sheets are not appropriately oriented with respect to the lines of curvature of the mechanical part along which the principal stresses are generally exerted.

In order to fabricate and obtain satisfactory mechanical properties for such preforms, whose shape follows at least one curved longitudinal generator line, it is necessary to place fiber element sheets such that the fiber elements are not parallel to the curved generator line. It is very difficult to produce sheets that provide a homogeneous covering without voids using this process. Indeed, the resulting mechanical properties are not satisfactory if the radial sheet does not cover the entire surface of the preform.

SUMMARY

The present invention is directed to a new process for placing fiber elements along a surface so as to address the above-described problem associated with known methods of forming preforms having at least one portion which has an annular, an ellipsoidal, or a truncated cone shape. The process allows the creation of smooth surface sheets without irregularities such as holes or voids. In particular, the present invention provides a process for fabricating sheets of non-parallel fiber elements suitable for use in the formation of, for example, annular or ellipsoidal preforms so as to make it possible to obtain an absence of voids or defects in the preform.

The present invention is further directed to the resulting preforms and composite parts. The present invention is also directed to a device adapted to implement the disclosed process and form the disclosed preforms.

In one exemplary embodiment, the present invention is directed to a process for placing at least one fiber element on a surface, wherein the fiber element is deposited on the surface and is bound to at least a portion of the surface such that the width of the deposited fiber element varies longitudinally. The width of the deposited fiber element may be modified upstream of the deposition step by way of a width control mechanism.

In preferred embodiments of the present invention, the disclosed process includes one or more of the following characteristics when they are not mutually exclusive:

the fiber element is dry before being deposited onto a surface, upstream of the width control device, the fiber element is precisely positioned with respect to elements of the width control device, the fiber element is fed to the width control device so as to be centered on an element of the width control device, the width control device provides a pass-through section, which preferably has a flat bottom surface for the variable width fiber element; the bottom of the pass-through section is bordered by a cylindrical support edge for the fiber element;

a number of fiber elements is deposited in non-parallel directions, preferably simultaneously, varying the widths of each of the fiber elements such that the width modification of each fiber element is associated with a distance modification between two neighboring fiber elements, a number of fiber elements is deposited in convergent directions, preferably simultaneously, decreasing the width of each of the fiber elements in the direction of convergence; preferably, the width of each of the fiber elements decreases proportionally to a distance separating the middle fibers of two consecutive fiber elements; according to this preferred embodiment, in the corresponding process, the width of each fiber element is modified proportionally to a distance modification between the middle fibers of the fiber elements;

the distance between the middle fibers of the fiber elements is modified to deposit the fiber elements so as to form an angle α between 25° and 65° with a family of curvature lines forming at least a part of a support surface onto which the fiber elements are deposited; in particular, the surface on which the fiber elements are deposited extends longitudinally along a curved longitudinal generator line (L), and the fiber elements are deposited so as to be secant to the longitudinal generator line (L), with each fiber element forming an identical non-zero angle at its intersection point with the curved longitudinal generator line (L), preferably with the fiber elements forming an angle of 90°, +60°, −60°, +45° or −45° with the curved longitudinal generator line (L); notably, such a fiber configuration results in increased isotropic properties of the mechanical part formed therefrom, the fiber elements are deposited so that no space or void exists between two consecutive fiber elements deposited on the surface, the fiber elements are deposited in the form of segments adjacent over their entire length; the fiber elements are deposited adjoining at the support surface, meaning that each fiber element is in contact with a neighboring fiber element or elements; such a fiber configuration enables a homogeneous cover of the support surface without gaps between the deposited fiber elements, the surface on which the fiber elements are deposited has an annular shape, the material of the fiber elements is selected from carbon, ceramics, glasses, or aramids, the fiber elements are continuous strands, the fiber elements are continuous strands composed of a set of 3000 to 24000 filaments, and the fiber elements are bound to the surface by a chemical binder.

In another exemplary embodiment, the process of the present invention relates to the fabrication of a perform, wherein the process comprises the steps of (i) superimposing several fibrous sheets extending in different directions, and (ii) binding together the superimposed sheets, wherein at least one portion of one of the fibrous sheets is fabricated by the process defined above.

The present invention also relates to preforms comprising a superimposition of several fibrous sheets extending in different directions and bound together, wherein at least one fibrous sheet contains at least one fiber element whose width varies longitudinally. The preferred characteristics of the above-described process also apply to preforms of the present invention.

Lastly, the present invention relates to a device for placing at least one fiber element on a surface, wherein the device includes means for manipulating and advancing a fiber element, means that make it possible to vary the width of the fiber element in its longitudinal direction, and means to deposit the fiber element in a desired direction.

BRIEF DESCRIPTION OF THE FIGURES

The present invention will now be described in detail by referring to the appended figures.

DETAILED DESCRIPTION

In accordance with the present invention, the width of a fiber element may be varied, thus obtaining a covering adapted to the surface on which the fiber element is deposited, even when the surface has a complex shape. The width of a fiber element is obtained by passing the fiber element over or through a device component capable of controlling and limiting the width via a calibration opening. The fiber element spreads (i.e., the width increases) when the fiber element passes through a calibration opening that is greater than the fiber width prior to passing through the opening. The fiber elements compresses (i.e., the width decreases) when the calibration opening is smaller than the fiber width prior to passing through the opening. In either case, modification of a fiber element width is performed without cutting the fiber element. The width modification may be obtained so as to modify the width of dry fiber elements. The width may be modified while maintaining the integrity of the fiber element, that is, without removing any portion of the fiber element and while maintaining a constant number of filaments in the fiber element.

In accordance with the present invention, a sheet of fiber elements having homogeneous fiber coverage is obtained by varying the width of the deposited fiber element or elements. In order to obtain continuous homogeneous fiber coverage of the surface on which the fiber elements are deposited, the present invention associates a deposit of neighboring fiber elements extending into convergent directions to a reduction in the width of the fiber elements in the direction of the convergence. Thus, the distance, measured at a surface of the support onto which the fiber elements are deposited, between "middle fibers" of two neighboring fiber elements is modified during a deposition operation onto at least a portion of the support surface. In accordance with the present invention, the middle fiber of each fiber element corresponds to an imaginary line stretching along the fiber element equidistant from its edges. The middle fiber can also be defined as the geometric locus of the intersections of the transversal cross sections of the fiber element. The distance modification between middle fibers of two neighboring fiber elements during a deposition operation makes it possible to deposit fiber elements, which are not parallel to each other within the fibrous sheet, but provide a controlled orientation so as to be perfectly oriented with respect to a direction of principal stress to which the composite material part containing the fibrous sheet will be subjected.

In accordance with the present invention, a fiber element is understood to be a set of filaments or fibers in the form of a bundle. The fiber element is a unit and does not comprise a set of strands or cables. Conventionally, a cable contains a larger number of filaments than a strand. Fiber elements used as part of the present invention are preferably of a material selected among carbon, ceramics, glasses, or aramids, with carbon being particularly preferred. The usable ceramics are notably silicon carbide and refractory oxides, such as alumina and zirconia. A strand generally contains 3,000 to 80,000 filaments, and preferably 12,000 to 24,000 filaments. In the case of carbon, a fiber element which contains more than 50,000 (50K) filaments is generally referred to as a "cable" whereas a carbon "strand" is a fiber element containing at most 24,000 (24K) filaments. Thus, there is no clear delineation between strands and cables, particularly since any delineation would depend on the constituent material. In a particularly preferred embodiment, the fiber elements of the present invention comprise 3 to 24K carbon strands. Constituent fibers can be discontinuous, cracked, or preferably continuous. Fiber elements generally present a parallelepiped transversal cross section, and therefore a certain width and thickness. The fiber elements are usually qualified as flat strands or cables. As an example, a 3K strand generally has a width of 1 to 3 mm, a 12K strand has a width of 3 to 8 mm, and a 24K strand has a width of 5 to 12 mm. A strand of 12,000 to 24,000 filaments will therefore most often have a width of 1 to 12 mm.

The fiber elements used in the present invention are dry, meaning that the fiber elements are neither impregnated, nor coated, nor associated with any binder before being transferred to a device capable of modifying and/or calibrating a fiber element width, or preferably before being deposited onto a surface. A fiber element thus comprises at least 98% by weight of fibers or filaments, and at most 2% by weight of a standard lubricating agent, wherein the weight percents are based on a total weight of a fiber element.

Fiber elements of this type are generally sold as spools of a certain width. Several methods are available to increase or reduce the width of a fiber element. Fiber element width can be increased by spreading the filaments, for example, by passage the fiber element over circular bars, or by vibration techniques. See, for example, International Patent Publication WO 98/44183, assigned to SOCIETE NATIONALE D'ETUDE ET DE CONSTRUCTION DE MOTEURS D'AVIATION (SNECMA) (Paris, France) and Hexcel Fabrics (Villeurbanne Cedex, France), which presents several techniques for cable spreading. It is also possible to reduce the width of a strand by passing the strand between two constrained surfaces. A simultaneous deposition of fiber elements will use as many spools as the number of simultaneously deposited fiber elements.

In accordance with the present invention, the lines of curvature are the surface lines on which the fiber element or elements are deposited, and whose geodesic torsion is zero. Thus, two families of lines of curvature formed by meridians and parallels exist for a surface of revolution, and two families of lines of curvature, which are the generatrices (i.e., straight lines) and their orthogonal trajectories, also exist for a developable surface. In the present invention, the median of the parallels in the first case, and the median of the generatrices in the second case is called a longitudinal generator line (L) (see, for example, longitudinal generator line L in FIG. 1).

In accordance with the present invention, at least one fiber element is deposited such that the width of the fiber element is variable along its length. The width of the fiber element is measured on the surface onto which the fiber element is deposited, transversally to the middle fiber of the fiber element.

This can be an advantage, for example, when the fiber element must be deposited on a surface in which a cavity has been prepared, and the fiber element must be deposited in the cavity.

An exemplary process according to the present invention is particularly adapted to be implemented in the construction of preforms. In the automobile or aeronautics industry, for example, it is often necessary to fabricate preforms in which at least one portion of the surface extends along a curved longitudinal generator line L, on which the longitudinal lines of curvature do not have a constant radius of curvature during a displacement transversal to the curved longitudinal generator line. In the following description, such surfaces will be referred to as "curved surfaces" such as surfaces on at least one annular, ellipsoidal, or truncated cone portion. To fabricate certain preforms, of which at least a portion of a surface S is curved, and to obtain satisfactory mechanical properties, typically at least one sheet 10 of fiber elements $11_1$ to $11_n$ is deposited so as to extend along a non-zero angle with respect to the longitudinal generator line L.

Figure 1:
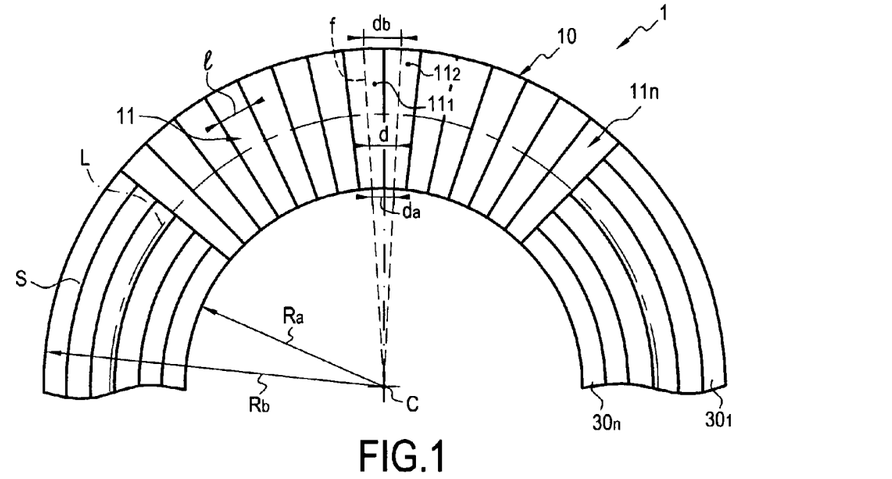
FIG. 1 illustrates one exemplary method of performing a process according to the present invention.

In the present invention as illustrated by FIG. 1, a fibrous sheet is fabricated on a support 1 by depositing a number of fiber elements $11_1$ to $11_n$ so as to at least partially cover the surface S of support 1 in one or several passes. Preferably, in the exemplary embodiment illustrated in FIG. 1, which represents a portion of an annular surface, fiber elements $11_1$ to $11_n$ form a 90° angle with the longitudinal generator line L, although fiber elements $11_1$ to $11_n$ could alternatively form an angle of 60° or of 45°, for example. Because the longitudinal generator line L of the deposition surface is curved, fiber elements $11_1$ to $11_n$ locally secant at an angle essentially identical to line L, are therefore not parallel, but convergent toward the portion of the surface presenting the smallest radius of curvature $R_a$, as illustrated in FIG. 1.

In the present invention, the deposited fiber elements have a width that varies, preferably regularly, along the length of the fiber element. The variation in the width of the fiber elements $11_1$ to $11_n$ permits compensation for a changing distance d between adjacent middle fibers f. Fiber elements 11 are deposited so that middle fibers f of two consecutive fiber elements 11 converge. Fiber elements 11 are deposited with a width l, which extends parallel to surface S onto which fiber elements 11 are deposited and which increases along the length of the strand in the direction of convergence. In each sheet that constitutes a preform, the fiber elements are deposited one next to another so as to preferably cover the entire surface onto which they are deposited. Neighboring fiber elements $11_1$ to $11_n$ are preferably deposited side by side with the least amount of space possible between two consecutive fiber elements 11 and/or the least possible overlap. The process according to the present invention makes it possible to maintain a very regular surface for the fibrous sheet produced, while limiting losses of material.

In the exemplary embodiment illustrated in FIG. 1, fiber elements 11 are transversal and cross longitudinal generator line L at a right angle. More precisely, the line or middle fiber f of a given fiber element 11 is orthogonal to a tangent of longitudinal generator line L at their point of intersection. In the case of an annular preform as shown in FIG. 1, middle fiber f of each fiber element 11 essentially coincides with a radius of a ring (i.e., circle) and therefore passes through the center C of the ring. In the illustrated embodiment, width l of each fiber element 11 increases during a radial displacement from a portion of the surface with the smallest radius of curvature $R_a$ to a portion of the surface with the largest radius of curvature $R_b$. In addition, advantageously width l of fiber elements 11 decreases proportionally to distance d separating middle fibers f of two consecutive fiber elements 11. A distance $d_b$ measured from an outer edge of an annular surface corresponding to radius of curvature $R_b$, is greater than a distance $d_a$ measured at an inside edge of an annular surface corresponding to radius of curvature $R_a$. In order to assure complete coverage of the surface to be covered, transversal fiber elements 11 are preferably deposited side by side and adjacent to one another over their entire length.

In the case of an annular preform, transversal fiber elements 11 are deposited so that their middle fibers f extend radially on the annular surface. In order to deposit a strand with a given initial width l along a radial direction on a circular surface with an internal radius $R_a$ and an external radius $R_b$ so as to produce a homogeneous fibrous sheet, the number of strands to be deposited (nbrF) on the circular surface is calculated by dividing the length of the circumference arc (i.e., $(\alpha)*R$, wherein a represents the angle, in radians, from a circle center to arc ends, and R represents the circle radius, which varies from $R_a$ to $R_b$) by the number of strands, or:

$$l=(\alpha)*R/(nbrF).$$

In addition, if the deposition at the external diameter $R_b$ is to remain homogeneous, the width l of the strands will be varied in direct proportion to the radius of curvature. If fiber elements are deposited on an annular surface, the fiber elements will preferably appear as segments of identical dimensions, as illustrated in FIG. 1.

As in the illustrated embodiment, for an annular surface, the width of the fiber elements will be modified in the same manner for all of the fiber elements. In other embodiments, it is possible to modify the width for each individual fiber element according to different amplitudes and/or directions.

A fiber element will typically have a constant width when it leaves the spool. The width of the fiber element is generally modified before being deposited on a given surface. Before being deposited, it is necessary to pass the fiber element or elements through a device component that is capable of varying the width of a fiber element or elements in the longitudinal direction. The device component may modify the width of each fiber element, control the width of each fiber element, and/or calibrate the width of each fiber element. The device component capable of calibration may comprise a calibration opening or space that is modified during a deposition step and through which a fiber element is moved. The fiber element may be fed through the calibration opening as the fiber element moves along a pass-through section. The fiber element is supported on the bottom of the pass-through section through which the fiber element moves. By moving the fiber element through the calibration opening, it is possible to continuously modify the width of the fiber element by varying the width of the pass-through section. The calibration opening has a variable width pass-through section, preferably having a rectangular or U-shape, and most preferably a flat bottom surface. The width of the calibration opening, measured parallel to its bottom surface, is modified during the deposition process, preferably in a continuous manner, so as to increase or decrease the width of the fiber element.

The variation in fiber element width is desirably continuous along a length of the fiber element. The bottom surface of the fiber element pass-through section is desirably bound by a cylindrical support edge supporting the fiber element. Thus, when the width of the fiber element is less than that of the pass-through section, the tension applied to the fiber element enable the fiber element to be spread on the cylindrical support.

Figure 2:
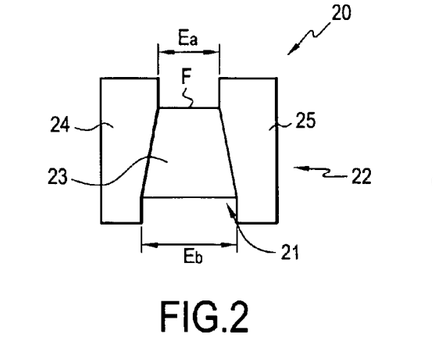
FIG. 2 is a frontal view of an exemplary device component for controlling the width of a fiber element according to the present invention.

FIG. 2 illustrates an exemplary device 20 capable of modifying a width of a fiber element. In this exemplary embodiment, exemplary device 20 comprises a variable width throat 21, whose width is selected as a function of the desired fiber element width. The width along the fiber element can be varied before deposition by passing the fiber element through a peripheral throat 21 formed in a cylindrical element 22, such that the width of the channel increases from value $E_a$ to value $E_b$ with a displacement inside throat 21 around cylindrical element 22 of over half of the circumference of the cylinder, then the width of the channel decreases from value $E_a$ to value $E_b$ with a displacement over the other half of the circumference of the cylinder. It is equally possible to vary the width of the fiber element up to an intermediate value included between these two values (e.g., values $E_a$ and $E_b$) as a function of the rotation applied to cylindrical element 22. The width of the fiber element before passing through device 20 will typically correspond, for example, to a width of the maximum spreading value $E_b$.

As illustrated in FIG. 2, for example, device 20 may be a cylindrical bar 23 delimited by two discs 24 and 25 of variable thickness. The throat 21 can be, for example, machined directly into cylindrical element 22. In this exemplary embodiment, discs 24 and 25 form the walls of throat 21, which provides a pass-through section of variable width for a fiber element. The full assembly (e.g., device 20) is rotated around an axis of cylindrical element 22. The fiber element is then fed so as to arrive flat and perpendicular to the axis of cylindrical element 22, meaning that the fiber element arrives tangentially to cylindrical bar 23 with its width parallel to cylindrical bar 23. The fiber element emerges, for example, after having performed essentially a half-turn or a quarter turn around the rotating cylindrical element 22. The rotation speed of cylindrical element 22 is adjusted as a function of the feeding rate of the fiber element. In general, the fiber element is cut on exit from device 20 so as to obtain a segment of fiber element having a desired length. By synchronizing the advancing rate of a fiber element with the rotation speed of cylindrical bar 23, it is possible to obtain a strand segment of desired length, where the fiber element's width increases regularly from value $E_a$ to value $E_b$, or decreases from value $E_b$ to value $E_a$. It is also possible to obtain a strand segment of desired length whose width varies between $E_a$ and $E_b$.

As shown in FIG. 2, calibration throat 21 desirably has a flat bottom surface F. This geometry makes it possible to avoid all slippage of the fiber element along the bottom surface of throat 21, which occurs in the case of a throat having a convex bottom surface configuration. A throat having a flat bottom surface allows perfect control of the fiber element width and enables a precise calibration of the strand width.

Figure 3:
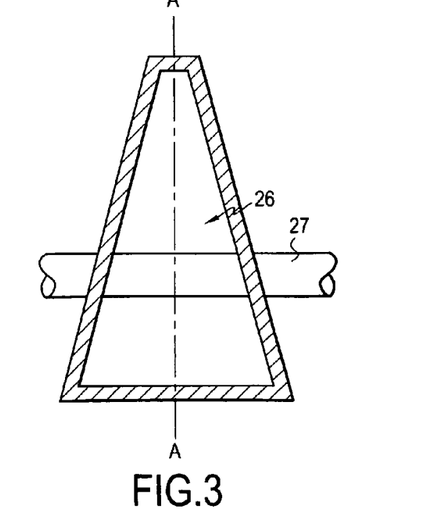
FIG. 3 is a front view of another exemplary device component for controlling the width of a fiber element according to the present invention.

Another exemplary device suitable for calibration of a fiber element width is shown in FIG. 3. In this exemplary embodiment, a window 26 of variable width may be used to modify the width of a fiber element. The fiber element is fed so as to arrive preferably perpendicular to a plane of window 26. Window 26 has an axis of symmetry A. Thus, by displacing by parallel translation the fiber element and window 26 relative to axis of symmetry A, it is possible to modify the width of the fiber element and to vary the fiber element width during deposition onto a surface. The fiber element is supported upstream or downstream of window 26 on a cylindrical support sill 27, which can be a support bar or an applicator cylinder directly downstream of window 26. A relative displacement therefore occurs equally between support sill 27 and window 26 by utilizing a translation parallel to axis of symmetry A. In this case, support sill 27 provides a bottom of the calibration opening.

The device suitable for calibration will usually be located in close proximity to the support (e.g., surface 1 shown in FIG. 1) so as to retain the width calibration. The distance is chosen so as to prevent the dry fiber element, which is under tension, from losing its width calibration and, in particular, from shrinking after exiting the width calibration device.

In order to maintain a width calibration, one embodiment of the disclosed process comprises precisely positioning the fiber element with respect to the device width calibration device. In particular, the fiber element is positioned so as to arrive in a central location of the calibration opening. A device component capable of positioning the fiber element is used so that the fiber element arrives at the calibration opening such that its middle fiber coincides with the center of the calibration opening. More precisely, the middle fiber is preferably aligned with a bisecting plane of the pass-through section of the calibration opening at the point of entry of the fiber element into the width calibration component.

If multiple fiber elements, typically in the form of fiber segments, are to be deposited, each segment may be deposited either successively or simultaneously. In order to form a fibrous sheet, a number of fiber elements are deposited side by side. As illustrated in FIG. 1, segments are advantageously deposited so as to cover the whole surface on which they are deposited, as well as extend in convergent directions. The variation in the width of the fiber elements deposited in a convergent direction enables the segments to be placed exactly edge to edge. These segments can be derived from the same fiber element or from different fiber elements. By modifying the distance between adjacent middle fibers of simultaneously deposited fiber elements, the disclosed process enables the fiber elements to precisely adapt to the configuration of the support surface. Similarly, by modifying the width of the fiber elements, the disclosed process enables a perfect adaptation of the orientation of the filaments that compose each fiber element to the configuration of the support surface. In other words, modifying the distances between middle fibers allows control of the orientation of the fiber elements, while modifying the width of each fiber element allows control of the orientation of the strands or filaments within the fiber elements.

The fiber elements can be deposited in any appropriate manner, manually or by an automatic device. The fiber elements are deposited in the form of segments of increasing (or decreasing) width. According to one exemplary fabrication method, fiber element segments are fed and deposited on a moving surface while the moving surface is progressively moved along its longitudinal generator line (L). Alternatively, the surface can remain in a fixed position, while displacing the fiber element deposition device, which can be moved by an automated mechanism. It is possible to deposit a single fiber element on each pass or to simultaneously deposit several fiber elements on each pass. In the case of an annular or ellipsoidal surface, displacement of the deposition surface is obtained by rotation around its axis, with a rotation pace corresponding to the width of the deposited segments.

Another exemplary embodiment of the present invention is a device for placing at least one fiber element on a surface wherein the device includes a component capable of manipulating and advancing a fiber element, a component capable of varying the width of the fiber element in its longitudinal direction, and a component capable of depositing the fiber element in a desired direction. The device is capable of placing a fiber element or a number of fiber elements along a support surface (e.g., surface 1 shown in FIG. 1). The device component capable of depositing a fiber element in a desired direction comprises a component capable of guiding the fiber element and a component capable of applying the fiber element onto a support surface. In other words, such a device includes a component capable of feeding the fiber element, a component capable of guiding the fiber element, a component capable of calibrating the fiber element, and a component capable of applying the fiber element to the support surface. In the case of a simultaneous deposition of multiple fiber elements, these components are present for each fiber element in the form of individual or collective components.

According to one exemplary embodiment of the present invention, the device comprises a component capable of continuously varying a calibration opening so as to systematically increase or decrease the width of a given fiber element. In the case of simultaneous deposition of multiple fiber elements, the component capable of modifying a width of the fiber elements can be adapted to modify the widths of all deposited fiber elements by the same amount, or on the contrary, be adapted to individually modify the width of each fiber element by different amounts and/or directions from one fiber element to another and/or from a group of fiber elements to another group of fiber elements.

In one exemplary embodiment of the present invention, the device components capable of modifying the width of each fiber element are integrated into the individual device components capable of guiding each fiber element. In a further exemplary embodiment of the present invention, the device components capable of modifying the width of each fiber element include a guiding throat of variable width. According to a preferred embodiment of the present invention, the device components capable of modifying the width of each fiber element include:

a guidance cylinder having an axis $\Omega$ and comprising a calibrating throat installed on at least a portion of the periphery of the cylinder, the calibrating throat having a variable width, and only a portion of which, referred to herein as an "active portion," is associated with (i.e., in contact with) a fiber element as the fiber element exits the width modification device component, and a device component capable of rotational displacement of the guidance cylinder along axis $\Omega$ so as to allow modification of the active portion of the calibration throat associated with the fiber element.

According to the present invention, in the case of simultaneous deposition of several fiber elements, the device component capable of guiding fiber elements can be implemented in a number of different ways and can assure individual and/or collective guidance of the fiber elements.

In one exemplary embodiment of the present invention, the device component capable of guiding fiber elements comprises individual components capable of guiding each fiber element and individual components capable of width calibration for each fiber element. In a further exemplary embodiment, the device may also include a device component capable of modifying the distance between middle fibers of fiber elements, which preferably are device component capable of distance modification between the individual device components capable of guiding each fiber element.

The device components capable of guiding fiber elements may include device components capable of modifying the distance between middle fibers of at least two neighboring fiber elements, so as to allow a modification of the distance measured at a support surface between the middle fibers of two neighboring fiber elements. According to the present invention, the device component capable of modifying the distance between middle fibers refers to:
- a device component capable of modifying only one distance between middle fibers of two neighboring fiber elements,
- or preferably, a device component capable of modifying distances between all fiber elements so as to allow the modification of all distances between middle fibers.

Similarly, the device component capable of modifying the distance between middle fibers can be adapted to allow a modification of the same value for all the fiber elements, or on the contrary, to allow an individualized modification of each distance between the middle fibers of two neighboring fiber elements.

In a preferred embodiment with a variable width guiding throat as described above and with a device for simultaneous deposition of a number of fiber elements in order to allow modification of the distance between the middle fibers of simultaneously deposited fiber elements, the device according to the present invention additionally includes a device component capable of modifying the distance between the active parts of multiple guidance cylinders.

According to a further embodiment, the device includes, upstream from the device component capable of controlling a fiber element width, a device component capable of positioning each fiber element with respect to the device component capable of controlling a fiber element width. In particular, these device components capable of positioning a fiber element are device components capable of centering each fiber element relative to the device components capable of width calibration. These device components capable of centering fiber elements can comprise a rotary comb or a comb with non-parallel, and particularly convergent teeth.

According to another embodiment, a device comprises a component capable of depositing a sheet of fiber elements on a surface along convergent directions, and a component capable of decreasing the width of the fiber elements in the direction of convergence where the width is decreased before deposition.

According to another embodiment, the width of the fiber element can be varied before deposition using device 20 as shown in FIG. 2, which comprises a peripheral throat 21 formed in a cylindrical element 22 having a variable width. In particular, the width of the channel increases from value $E_a$ to value $E_b$ with a displacement inside the throat around the cylindrical element over half of the circumference of the cylinder, then the width of the channel decreases from value $E_a$ to value $E_b$ with a displacement over the other half of the circumference.

The device includes a component capable of feeding and advancing the fiber element through device 20 as defined above, which also makes it possible to adjust the fiber element's width. Such feeding and advancing components can, for example, comprise two rotating rollers such that the fiber element is passed between the rollers at the exit of device 20. A component capable of cutting the fiber element can also be provided at the exit of device 20 in order to allow the deposition of fiber elements in independent or discontinuous segments.

The deposition means can be implemented in any appropriate manner by various techniques well-known in the art.

According to another implementation embodiment, the installation can additionally include means for applying a binder on the deposited surface or on the fiber element itself just at the moment of the fiber element deposition.

Depending on the nature of the binder used, i.e., whether the binder is applied with the installation or not, the binder can also include a binder activation component (e.g., curing agent) that can be implemented by any appropriate method, such as a source of radiation like infrared, for example.

The installation includes a control unit that assures the control and synchronization of the different portions of the installation.

In another exemplary embodiment of the present invention, the deposition device is designed to be operated with an automated installation or a robot such as described in U.S. Pat. No. 4,699,683 or European Patent No. 0 535 264. In this embodiment, the device includes for a device component capable of connecting to and adapting to a robot arm or machine tool with at least five freedoms of motion for depositing fiber elements as a sheet on a support having a complex surface.

A number of fiber elements can desirably be deposited simultaneously, which enables a substantial increase in fabrication rate compared to individual placement of each fiber element.

Different types of devices for simultaneous deposition of a number of fiber elements can be used to allow both (i) a controlled modification of the distance between middle fibers, and (ii) a controlled modification of the width of fiber elements. In an exemplary embodiment, a deposition device as shown in FIGS. 4 to 8 includes fiber element feed 30, fiber element guidance component 31 and a fiber element application cylinder 32 capable of applying fiber elements onto surface A. According to this exemplary embodiment, applicator cylinder 32 is mobile in rotation around axis A and guides fiber elements before being applied and pressed onto support surface A. Applicator cylinder 32 is located a sufficient distance from surface A on which the fiber element or elements are deposited so that the distance corresponds essentially to a thickness of the fiber element, so as not to modify the thickness of the fiber element and hence its width.

Figure 4:
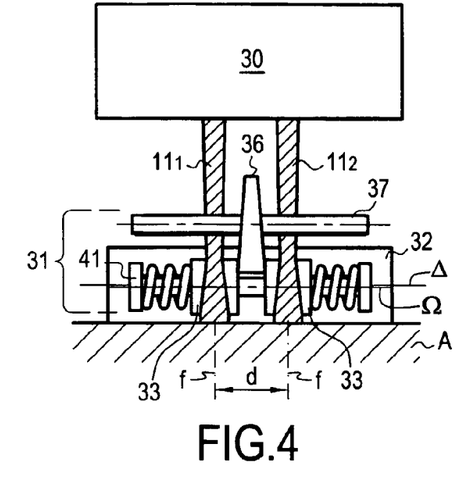
FIG. 4 is a front view of an exemplary deposition device according to the present invention that is capable of modifying the distance between fiber elements and to modify the widths of the fiber elements.
Figure 5:
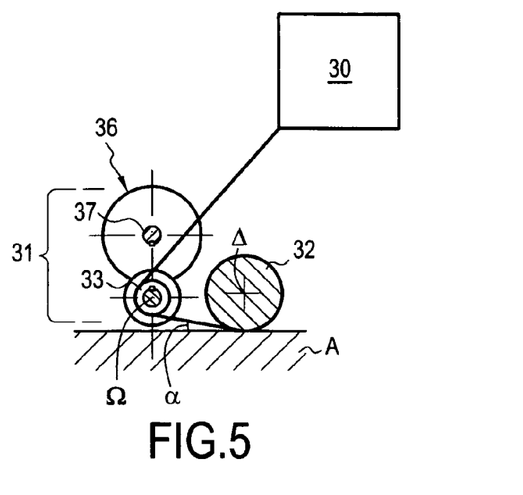
FIG. 5 is a side view of the exemplary device according to FIG. 4.
Figure 6:
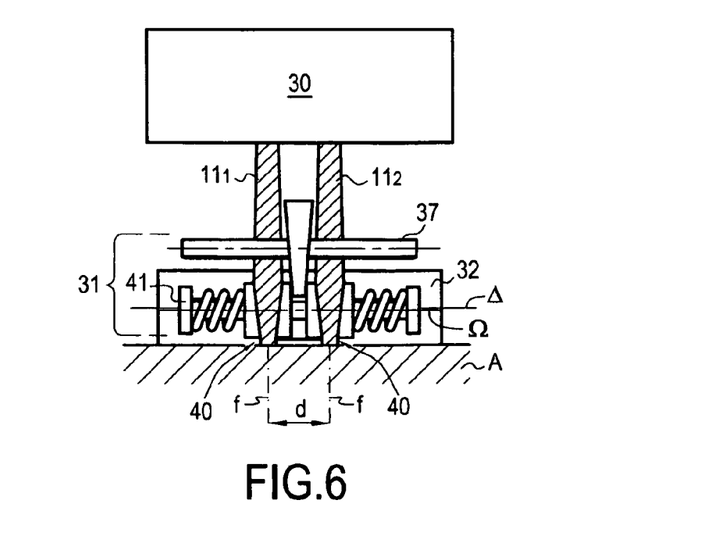
FIG. 6 is a view similar to FIG. 4 showing another operating phase of the exemplary device.

Device components capable of modifying the distance between middle fibers and the width of the fiber elements are integrated into guidance component 31. Thus, as illustrated in FIG. 5, applicator cylinder 32 is usually positioned at a short distance, and preferably as close as possible, from an exit of guidance component 31. This prevents the dry fiber elements leaving guidance component 31 from shrinking as a result of tension applied to the dry fiber elements. Similarly, guidance component 31 is preferably positioned with respect to support surface A so that at the deposition point, an angle α is formed between a trajectory of a fiber element and support surface A and angle α is less than 20°. This produces the weakest wrapping of a fiber element on applicator cylinder 32, thus avoiding spreading of the strand. Desirably, guidance component 31 includes as many individual guidance components as there are deposited fiber elements, for example, as illustrated in FIG. 4, two individual guidance components (i.e., throats 34) within guidance component 31.

Figure 7:
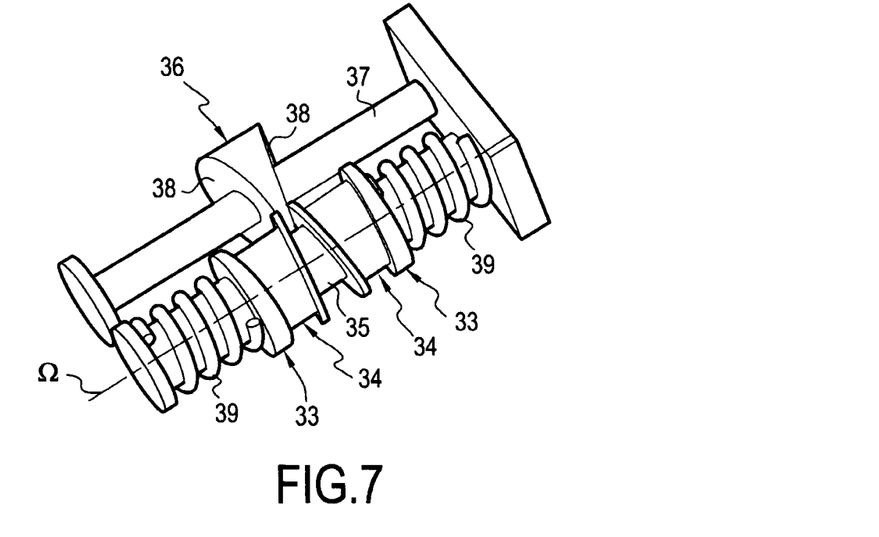
FIGS. 7 and 8 show construction details of components of the exemplary device shown in FIGS. 4-6, wherein the components are capable of guiding the fiber elements.
Figure 8:
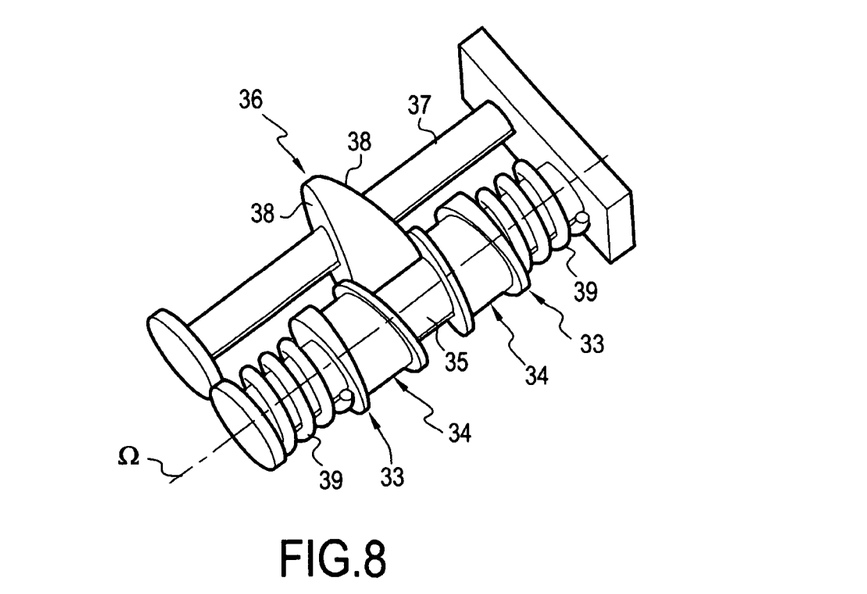

As shown in more detail in FIGS. 7 and 8, each of the individual guidance components comprise cylinders 33 having axis Ω and equipped with throats 34 for receiving and guiding fiber elements. In order to allow a distance modification between the middle fibers of the fiber elements and a distance modification between a central location of throats 34, cylinders 33 are positioned along shaft 35, which rotates about axis Ω. Guidance component 31 further comprises device components capable of modifying the distance between outer edges of individual throats 34 (and the distance between middle fibers) in the form of lateral surfaces (e.g., side walls) of cylinders 33 and cam 36, which comprises a truncated cylinder of revolution whose base contacts shaft 35. Cam 36 is mounted on shaft 37 having axis Ω' (extending through a central portion along a length of cam 36 and shaft 37) on which cam 36 is locked, both in rotation and translation. Cam 36 is then inserted between cylinders 33, which are each maintained in contact against side walls 38 of cam 36 by means of spring 39. An axial rotation of shaft 37 results in a rotation of cam 36, which enables the modification of the distance between the middle fibers of the guidance throats 34 as can be seen by comparing the views in FIGS. 4 and 6 or in FIGS. 7 and 8.

The individual device components capable of modifying the width of each fiber element are formed by each variable width throat 34, which are referred to herein as calibrating throats, and installed on portions of the periphery of cylinder 33 as seen in FIGS. 7 and 8. In order to allow a modification of active portions 40 (shown in FIGS. 6, 11A and 11B) of throats 34, which are in contact with the fiber elements, guidance component 31 further comprises device component 41 capable of providing rotational displacement of shaft 35 about axis Ω. As shaft 35 rotates about axis Ω, the active portions 40 of width calibration throats 34 rotates. The lateral surfaces of width calibration throats 34 thus exert increased or decreased constraint on fiber elements comprising a bundle of strands or filaments and positioned along active portions 40 so as to adjust the widths of the fiber elements. The modification of width may be obtained on a constant number of filaments without structural alteration or degradation of the fiber element or the strands or filaments within the fiber element.

Figure 9:
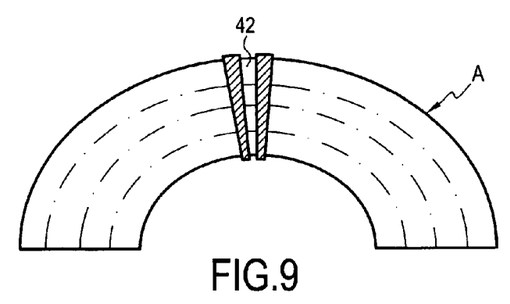
FIG. 9 shows an exemplary display of deposited fiber elements.
Figure 10:
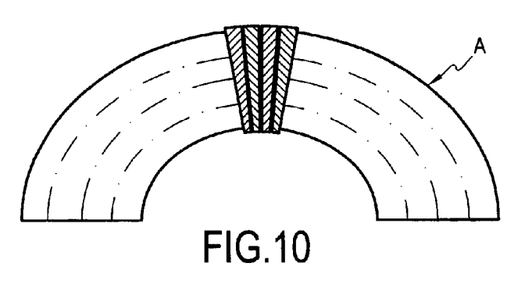
FIG. 10 shows another exemplary display of deposited fiber elements.

During operation of the above-described device (shown in FIGS. 4-8) so as to fabricate a fibrous sheet on surface A, a single pass simultaneously deposits a group of fiber elements separated two by two along support surface A by an inserted space 42 as shown in FIG. 9. A subsequent pass simultaneously deposits another group of fiber elements each placed in the space separating the fiber elements deposited during the preceding stage as illustrated in FIG. 10. Fiber elements are preferably deposited next to each other so as to assure total coverage of surface A. The deposition process of the present invention enables control of both (i) orientation of fiber elements and their filaments, as well as (ii) complete coverage of the receiving surface utilizing a constant number of fiber elements and filaments therein. In this exemplary embodiment, the process of the present invention includes:

a stage of simultaneous deposition of a group of fiber elements separated two by two along a support surface by an inserted space, and a stage of simultaneous deposition of a group of fiber elements at least one of which is placed in an inserted space separating the fiber elements deposited during the preceding stage.

Figure 11A:
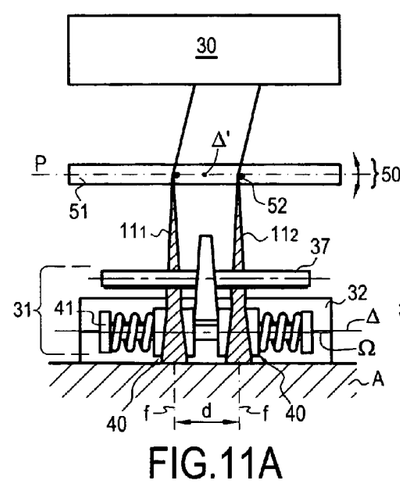
FIGS. 11A and 11B illustrate an exemplary device according to the present invention that is capable of modifying the distance between fiber elements and to modify the widths of the fiber elements and further comprises a device component capable of positioning fiber elements relative to the width-modifying device.
Figure 11B:
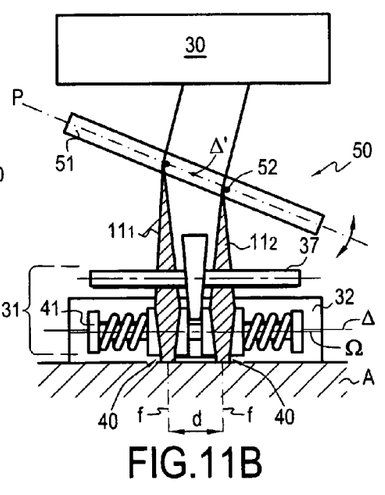

In order to allow each fiber element to be centered with respect to throat 34 as the fiber element moves along guidance cylinder 35, the device includes a device component 50 capable of positioning fiber elements upstream from the guidance component (e.g., guidance cylinder 35). Positioning component 50 enables modification of the distance between fiber elements upstream from guidance component 31 and coordination of the distance modification with the displacement of guidance component 31. In particular, the distance variation d' between middle fibers of two neighboring fiber elements (as measured along an axis running parallel to axis Ω and measured similarly as measurement d) is modified synchronously with the displacement of the width calibration throats 34. The exemplary device shown in FIGS. 11A and 11B is similar to the exemplary device shown in FIG. 6 with the addition of fiber element positioning component 50 upstream from guidance component 31 with respect to the moving direction of the fiber elements. Exemplary positioning component 50 comprises comb 51, which comprises at least as many teeth 52 as the simultaneously deposited fiber elements $11_1$ to $11_n$. Teeth 52 of comb 51 are parallel to each other and contained in a plane P. Each tooth 52 provides a guide and reference bar for a given fiber element as shown in FIGS. 11A and 11B.

In order to allow a variation of distance d' as measured upstream of guidance component 31 between middle fibers of the fiber elements, comb 51 is allowed to move in rotation along an axis Δ' parallel to plane P and perpendicular to axis Δ (i.e., axis Δ' extends into the page). The rotation of comb 51 thus makes it possible to modify the distance between fiber elements $11_1$ and $11_2$ as shown in FIGS. 11A and 11B. Each guide and reference bar tooth 52 for a fiber element is positioned with respect to a corresponding calibration throat 34 so that the fiber element arrives in a central location of calibration throat 34. The fiber element may preform a quarter turn between the exit of comb 51 and upon arrival at calibration throat 34.

Of course, it is possible to utilize other fiber element positioning components in the present invention other than those shown in FIGS. 11A and 11B. Other fiber element positioning components suitable for use in the present invention include, but are not limited to, those disclosed in the following documents: WO 84/00351, EP 0681 981, FR 1 584 056, and FR 2 579 964, which describe systems of rotating combs and/or combs with non-parallel teeth.

Figure 12:
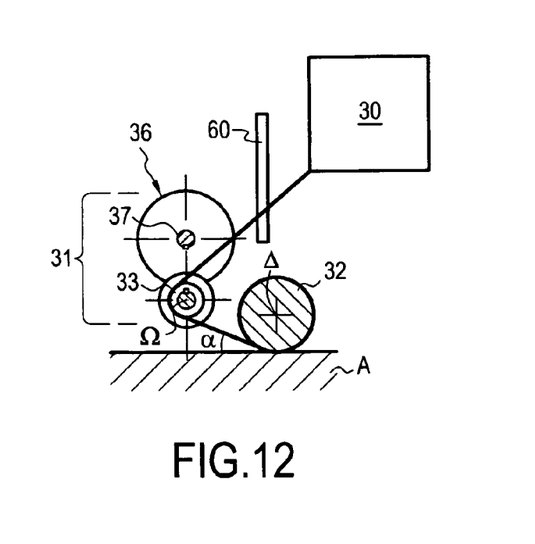
FIG. 12 is a side view of another exemplary device according to the present invention that is capable of modifying the distance between fiber elements and to modify the widths of the fiber elements and further comprises a device component capable of positioning fiber elements relative to the width-modifying device.
Figure 13:
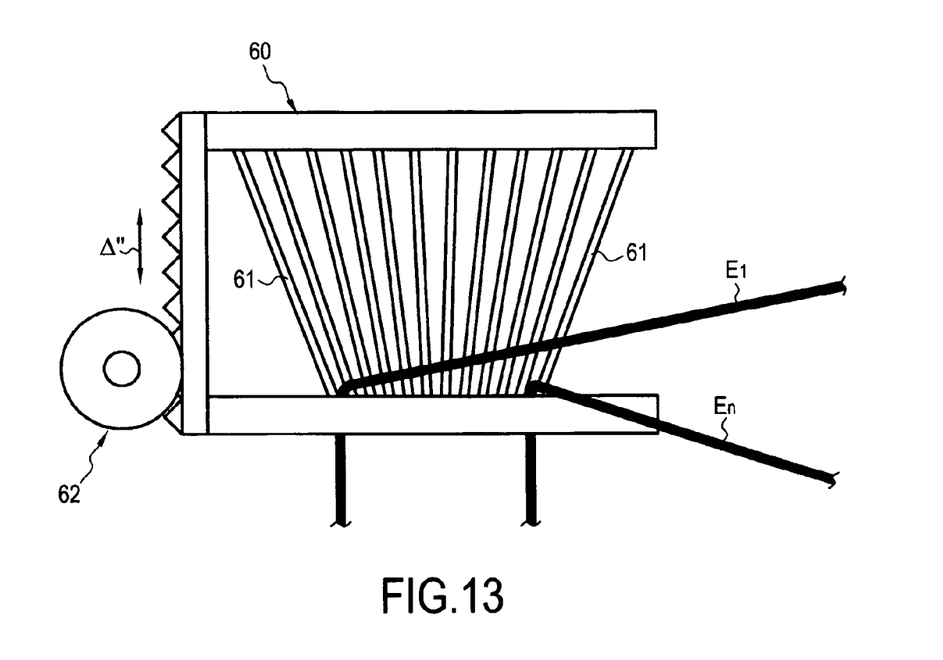
FIG. 13 is a front view of another exemplary component capable of positioning fiber elements relative to the width-modifying device and a component capable of calibrating fiber element widths.

The exemplary device shown in FIG. 12 is similar to the exemplary device shown in FIG. 5 with the addition of a comb comprising non-parallel teeth 60 positioned between the fiber element feed 30 and guidance component 31. FIG. 13 provides a frontal view of comb 60, which serves as a positioning component for fiber elements $E_1$ to $E_n$ with respect to calibration throats 34.

Comb 60 contains at least as many teeth 61 as the simultaneously deposited fiber elements $E_1$ to $E_n$. Teeth 61 are contained in a plane parallel to axis Ω of shaft 35 supporting calibration throats 34, and converge in the same direction. Each tooth 61 forms a guide and reference bar for a fiber element. In order to guarantee the effectiveness of comb 60, each fiber element follows an oblique trajectory upstream of comb 60 with respect to (i) the plane of comb 60 and with respect to (ii) a plane passing through a corresponding tooth and perpendicular to the plane of comb 60. In order to allow a modification of distance between middle fibers of the fiber elements, a device 62 is provided to displace comb 60 in a direction Δ" perpendicular to axis Ω of shaft 35 supporting calibration throats 34. In FIG. 13, comb displacement device 62 comprises a rack locked to comb 60 and driven by the pinion of a step motor. By varying the position of comb 60, it is possible to vary the distances between two neighboring fiber elements and to adjust this distance with respect to the positions of width calibration throats 34. As described earlier, displacement of comb 60 can be synchronized with displacement of width calibration throats 34 so that each fiber element arrives at a central location of the pass-through section of width calibration throats 34. Each guide and reference tooth 61 for a corresponding fiber element $E_n$ is then positioned with respect to corresponding width calibration throats 34 so that the fiber element arrives centered at the width calibration throats 34 entry point, with the fiber element desirably performing a quarter turn between the exit of comb 60 and the arrival at width calibration throat 34.

Figure 14:
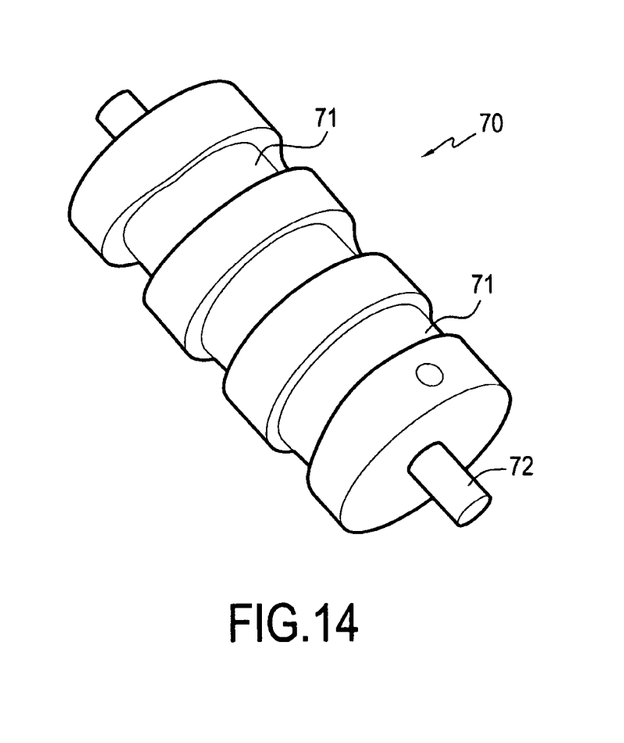
FIG. 14 is a perspective view of an exemplary multi-throat cylinder capable of modifying a width of fiber elements.

According to another exemplary embodiment, the above-described device comprises a guidance component (e.g., guidance component 31) that includes a fiber element width modifying component capable of modifying the width of fiber elements, as well as the inter-fiber distance between fiber elements in the form of a multi-throat cylinder such as exemplary multi-throat cylinder 70 as shown in FIG. 14. Exemplary multi-throat cylinder 70 has a number of non-parallel width calibration throats 71 having a variable width along a circumference of a given width calibration throat 71. The number of calibration throats 71 is at least equal to the number of simultaneously deposited fiber elements.

In particular, calibration throats 71 have convergent trajectories and the width of calibration throats 71 varies proportionally to the distance that separates the convergent trajectories (i.e., the side walls or lateral surfaces of calibration throats 71). In this case, each fiber element is fed and guided into each of calibration throats 71 before being applied to the support. Exemplary multi-throat cylinder 70 is positioned upstream from the device component capable of applying fiber elements (e.g., applicator cylinder 32) by replacing guidance component 31 as shown in FIGS. 5 and 12. Rotating multi-throat cylinder 70 around driveshaft 72 varies continuously and simultaneously the inter-fiber width and the distance separating fiber elements.

Calibration throats 34 on shaft 35 shown in FIGS. 7 and 8, and calibration throats 71 shown in FIG. 14 have a flat-bottomed pass-through section for the fiber elements as described above in reference to throat 21 shown in FIG. 2. The operation of the entry and exit of a fiber element into and out of calibration throats 34 and 71 is also the same as described above in reference to throat 21 shown in FIG. 2. In particular, each fiber element preferably arrives at a central location with respect to the pass-through section at the entrance of calibration throats 34 and 71 and exits after performing a half-turn on the cylindrical support surface. The width of the pass-through section at the exit of the calibration throat determines the width of the fiber element to be deposited.

In the fabrication of preforms, sheets of fiber elements of variable width are deposited either on a support or mold surface, or on an anterior sheet of fiber elements extending, for example, along the longitudinal generator line (L) of the surface. In general, several sheets of fiber elements extending in different directions are associated with each other. Each of the sheets can be bound to the surface on which it is deposited by means of a variety of techniques, such as described in French Patent Application FR 2 853 914 assigned to Hexcel Fabrics (Villeurbanne Cedex, France).

According to the present invention, in order to guarantee the positioning stability of deposited fiber elements, the deposited fiber elements are preferably bound to support surface 1 (see, FIG. 1). Adhesion of the fiber elements to the surface on which they are deposited can be accomplished by means of a chemical binder deposited previously on the surface, or deposited concurrently with the deposition of the fiber elements. Generally in a preform, the weight percentage of chemical binder with respect to the total weight of the preform (total weight of the preform is equal to the weight of the fiber elements plus the chemical binder) varies from 0.1 to 25% and advantageously from 3 to 10%. The weight of the fiber elements thus represents 99.9% to 75%, and preferably 97 to 90%, of the total weight of the preform. As known in the art, it may be necessary to activate the binder by thermal energy or other means. Suitable hardeners include adhesive agents and thermoplastic or thermohardenable (i.e., thermosettable) powders or resins.

The ends of fiber element segments 11 can also be attached by thermal adhesion along one or both edges of the curved surface, for example, by means of an adhesive strip placed on those edges.

Of course, the process according to the present invention can also be implemented to fabricate one portion of a sheet. In the case of an ovoid preform containing rectilinear portions, for example, the portions of the transversal sheet in the curved portions may be fabricated according to the process of the present invention, while portions in the rectilinear area may be fabricated with parallel fiber elements of constant width.

Of course, the above-mentioned different characteristics and variations of the performs, processes and device components according to the present invention can be implemented with each other in different combinations when they are not mutually exclusive.

In another embodiment of the present invention, a fabrication process for a preform comprises the steps of superimposing several fibrous sheets extending in different directions and binding together the superimposed sheets, wherein at least one portion of one of the sheets is fabricated as detailed above.

Preforms produced according to the present invention generally comprise (i) at least one sheet of fiber elements essentially parallel with each other and parallel to the longitudinal generator line (L) of the surface and (ii) at least one sheet of fiber elements that are not parallel to the longitudinal generator line shown in FIG. 1. Such preforms can, for example, contain (i) a first sheet of fiber elements $30_1$ to $30_n$ extending along generally ovoid twists (in the case of an ellipsoidal preform) or concentric circles (in the case of an annular preform) deposited in a spiral, and referred to as a 0° strand sheet, (ii) a second sheet of fiber elements extending along directions secant to the strands of the first sheet, for example, along radial or centrifugal directions and presenting variable widths as described previously, and referred to as a 90° strand sheet, then (iii) another sheet of fiber elements extending along twists or circles, and (iv) a new sheet of non-parallel fiber elements, for example at +60°, −60°, +45° or −45°; and so forth until the desired thickness and shape are obtained. Other exemplary embodiments include preforms having shapes adapted for the fabrication of portholes.

The following two examples illustrate the process according to the present invention.

A first example concerns the radial deposition of a 12K 880 Tex carbon strand on an annular porthole preform with an internal radius of 134 mm and an external radius of 215 mm. Such carbon strands have a width of 5-6 mm as they leave the spool. In this example, the deposited strand segments have a width which increases evenly from 2.45 mm to 3.93 mm while moving radially from the interior to the exterior of the preform, and the strand segments are deposited without overlap or gaps between the strands.

A second example concerns the radial deposition of a 12K 800 Tex carbon strand on a preform for a fuselage beam with an internal radius of 1,500 mm and an external radius of 1,600 mm. In this case, the deposited strand segments have a width which increases evenly from 4.13 mm at the internal radius to 4.41 mm at the external radius, so as to have no overlap or gaps between the strands.

If the two preceding examples are repeated using a 24K 1600 Tex strand instead of a 12K 800 Tex strand, all the strand width values are doubled.

The invention claimed is:

1. A process for placing fiber elements onto a surface, comprising the steps of:

in a first deposition pass, simultaneously depositing a first group of two or more fiber elements onto the surface so as to form a first group of deposited fiber elements on at least one part of the surface, wherein a width of one or more of the deposited fiber elements of the first group varies longitudinally along the surface and adjacent deposited fiber elements of the first group have a empty space therebetween, wherein modification of the width of the one or more deposited fiber elements is performed without removing any portion of the one or more deposited fiber elements so as to maintain a constant number of filaments along a length of each of the one or more deposited fiber elements; and in a second deposition pass, the second deposition pass being subsequent to the first deposition pass, simultaneously depositing a second group of two or more fiber elements onto the surface so as to form a second group of deposited fiber elements on at least one part of the surface, wherein a width of one or more of the deposited fiber elements of the second group varies longitudinally along the surface and at least one gap-filling deposited fiber element of the second group is placed within at least one empty space between deposited fiber elements of the first group, wherein no space or void exists between said at least one gap-filling deposited fiber element of the second group and deposited fiber elements of the first group adjacent to said at least one gap-filling deposited fiber element.

2. The process according to claim 1, wherein each of said simultaneously depositing steps comprises:
simultaneously depositing a plurality of deposited fiber elements in non-parallel directions along the surface.

3. The process according to claim 1, wherein at least a portion of said deposited fiber elements are deposited in convergent directions, decreasing the width of each of said portion of deposited fiber elements in a direction of convergence.

4. The process according to claim 1, wherein said deposited fiber elements form an angle of 90°, +60°, −60°, +45° or −45° with a longitudinal generator line of an object.

5. The process according to claim 1, wherein said deposited fiber elements of the first and second groups are deposited as segments adjacent to each other over their entire length.

6. The process according to claim 1, wherein the surface on which said deposited fiber elements are deposited has an annular shape.

7. The process according to claim 1, further comprising the step of:
binding of the deposited fiber element to the surface by a chemical binder.

8. A process for fabricating a fibrous sheet comprising the process of claim 1.

9. A process for fabricating a preform comprising:
superimposing several fibrous sheets of fiber elements extending in different directions, and
binding together the superimposed fibrous sheets,
wherein at least a portion of one of the fibrous sheets is fabricated by the process of claim 1.

10. The process according to claim 1, further comprising:
passing one or more fiber elements of the first group of two or more fiber elements over or through a device component so as to modify the width of the one or more fiber elements prior to said depositing of the first group of two or more fiber elements.

11. The process according to claim 10, wherein the device component comprises one or more variable width calibrating throats.

12. The process according to claim 1, wherein the two or more fiber elements of the first and second groups comprise dry fiber elements.

13. The process according to claim 4, wherein the longitudinal generator line is a curved longitudinal generator line extending along an outer surface of an object having a curve therein.

14. A process for placing two or more fiber elements onto a surface, comprising the steps of:
modifying a width of one or more fiber elements of a first group of two or more fiber elements, said modifying step resulting in a varying width along a length of the one or more fiber elements without removing any portion of the one or more fiber elements and while maintaining a constant number of filaments along the length of each of the one or more fiber elements;

in a first deposition pass, simultaneously depositing the first group of two or more fiber elements onto the surface so as to form a first group of deposited fiber elements on at least one part of the surface, wherein a width of one or more of the deposited fiber elements of the first group varies longitudinally along the surface and adjacent deposited fiber elements of the first group have a empty space therebetween; and in a second deposition pass, the second deposition pass being subsequent to the first deposition pass, simultaneously depositing a second group of two or more fiber elements onto the surface so as to form a second group of deposited fiber elements on at least one part of the surface, wherein a width of one or more of the deposited fiber elements of the second group varies longitudinally along the surface and at least one gap-filling deposited fiber element of the second group is placed within one or more empty spaces between deposited fiber elements of the first group.

15. The process according to claim 14, wherein said modifying step comprises passing the one or more fiber elements over or through one or more variable width calibrating throats.

16. A process for placing two or more fiber elements onto a surface, comprising the step of:
in a first deposition pass, simultaneously depositing a first group of two or more fiber elements onto the surface so as to form a first group of deposited fiber elements on at least one part of the surface, wherein a width of one or more of the deposited fiber elements of the first group varies longitudinally along the surface and adjacent deposited fiber elements of the first group have a empty space therebetween, wherein modification of the width of the one or more deposited fiber elements is accomplished by modifying a longitudinal direction of individual filaments within one or more of the one or more deposited fiber elements while maintaining a constant number of filaments along a length of each of the one or more deposited fiber elements;

passing one or more fiber elements of the first group of two or more fiber elements over or through a device component to modify a width of the one or more fiber elements along a length of the one or more fiber elements without removing any portion of the one or more fiber elements and while maintaining a constant number of filaments along a length of each of the one or more fiber elements prior to said depositing step;

passing one or more fiber elements of a second group of two or more fiber elements over or through a device component so as to modify a width of the one or more fiber elements of the second group of two or more fiber elements along a length of one or more fiber elements of the second group of two or more fiber elements without removing any portion of the one or more fiber elements of the second group of two or more fiber elements and while maintaining a constant number of filaments along a length of each of the one or more fiber elements of the second group of two or more fiber elements; and in a second deposition pass, the second deposition pass being subsequent to the first deposition pass, simultaneously depositing the second group of two or more fiber elements onto the surface so as to form a second group of deposited fiber elements on at least one part of the surface, wherein a width of one or more of the deposited fiber elements of the second group varies longitudinally along the surface and at least one gap-filling deposited fiber element of the second group is placed within one or more empty spaces between deposited fiber elements of the first group.

17. The process according to claim 16, further comprising:
synchronizing (i) an advancing rate of the one or more fiber elements of the first group through the one or more variable width calibrating throats with (ii) a rotation speed of the one or more variable width calibrating throats along an axis of rotation extending through the device component so as to result in the width of one or more of the deposited fiber elements of the first group varying longitudinally along the surface.

18. The process according to claim 16, further comprising:
synchronizing (i) an advancing rate of the one or more fiber elements of the first group through the one or more variable width calibrating throats with (ii) a rotation speed of the one or more variable width calibrating throats along an axis of rotation extending through the device component so as to result in the width of one or more of the deposited fiber elements of the first group varying longitudinally along the surface; and synchronizing (i) an advancing rate of the one or more fiber elements of the second group through the one or more variable width calibrating throats with (ii) the rotation speed of the one or more variable width calibrating throats along the axis of rotation extending through the device component so as to result in simultaneous depositing of the second group of two or more fiber elements onto the surface so as to form a second group of deposited fiber elements on at least one part of the surface, wherein a width of one or more of the deposited fiber elements of the second group varies longitudinally along the surface and at least one gap-filling deposited fiber element of the second group is placed within one or more empty spaces between deposited fiber elements of the first group.

* * * * *